July 21, 1970     J. W. HANNAH     3,521,379

TEACHING MACHINE

Filed March 31, 1967     3 Sheets-Sheet 1

INVENTOR.
JACK W. HANNAH

BY Sherman & Shalloway

ATTORNEYS

INVENTOR.
JACK W. HANNAH
BY Sherman & Shallaway
ATTORNEYS

United States Patent Office 3,521,379
Patented July 21, 1970

3,521,379
TEACHINE MACHINE
Jack W. Hannah, 1816 Springmill Road,
Mansfield, Ohio 44906
Filed Mar. 31, 1967, Ser. No. 627,545
Int. Cl. G09b 7/08
U.S. Cl. 35—9
8 Claims

ABSTRACT OF THE DISCLOSURE

The device of this invention comprises a teaching machine wherein improved means for selecting and positioning a lesson frame in response to the operator's response to a viewed lesson frame are provided. The improved means comprises a rectangular film having a plurality of lesson frames each having code means thereon which film is held in a movable holder; the holder is moved in response to means actuated by the answer chosen for the viewed frame, and is positioned for viewing the next frame when the answer signal correlates with a signal automatically registered from the viewed frame.

---

This invention relates to a self-operated teaching machine that will automatically select a series of lessons for the operator-student. More particularly, this invention relates to a machine that will select a subsequent lesson that corresponds with the student's response to the next previous lesson. Specifically, the device of this invention relates to a machine for presentation of lessons that are coded with information which determines what the next presentation will be, depending on the response of the student.

Such a machine has been described in my prior U.S. Pat. 3,191,315 but shows means whereby the presentation of lessons is accomplished through a film strip; wherein the film strip contains coding, part of which identifies an associated lesson frame and part of which identifies the frames a student will next be shown if he responds to information on the lesson by selecting certain push buttons. The machine automatically reads the coding and seeks the proper subsequent frame from the plurality of frames imprinted on the film strip.

The device of this invention offers several improvements over the means described in the invention of Pat. 3,191,315. The invention herein-described provides for the plurality of lesson frames to be imprinted on a rectangular film rather than on a film strip. Furthermore, while each lesson on the rectangular array has associated with it coding which is automatically read to indicate which subsequent lesson should be viewed in accordance with the student's response, unlike the aforementioned invention of Pat. 3,191,315, the several means described in this invention do not require a specific identification code to accompany each lesson frame as previously required.

It is a principal object of this invention to provide a device whereby a specific subsequent lesson may be selected as a result of and correlated to an operator's response to a lesson frame being viewed.

It is a further object of this invention to provide means for automatically positioning a lesson chosen from a plurality of possible lessons in response to an operator's signal.

It is yet another object of this invention to provide means for choosing a correlated response to a viewed lesson wherein the response is adapted to educate the operator.

The objects and advantages of the device of this invention will be more clearly understood with reference to the drawings, in which FIG. 1 shows a screen on which lesson information from a rectangular film array is projected, plus control means used by the operator-student;

Like reference numerals indicate like parts throughout the several figures of the drawings.

Figure 1:
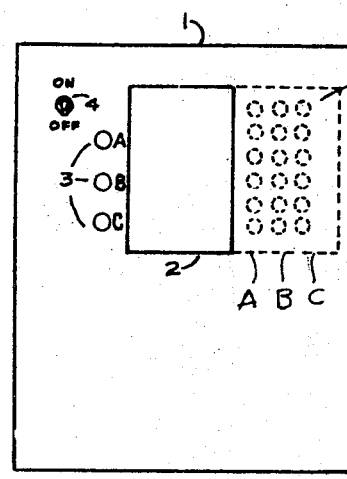
Figure 2:
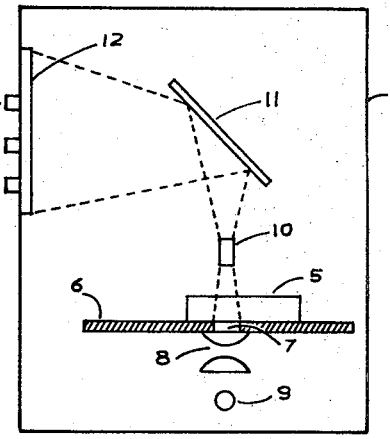
FIG. 2 is a cutaway side view of a device showing basically how the rectangular film array is supported in relation to an optical projection system and a photocell code reading system.
Figure 3:
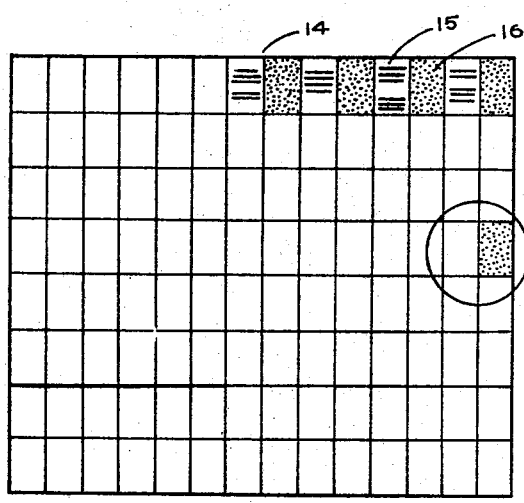
FIG. 3 is a typical rectangular array imprinted on film containing a plurality of lessons with associated coding.
Figure 4:
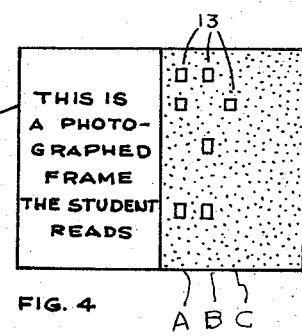
FIG. 4 is an enlarged view of a single information frame from the array of FIG. 3 with its associated coding.

Referring now to FIG. 1, the device is housed within a case 1. The front of the case contains a view screen 2 and a plurality of switches (designated A, B, C, etc.) 3 which the student pushes to indicate his choice of several answers to various information, questions, statements and answers appearing on the screen. The student turns on this machine by a switch 4. Located in the machine, in such a manner as to be readily accessible by the student, is a holder 5 (see FIG. 2) in which the student can readily insert a rectangular sheet of film 14 (see FIG. 3). This holder 5 is capable of sliding over the surface of a table-like plate 6, in which is provided an aperture 7 approximating the combined size of a single frame 15 and associated coding 16 on the rectangular sheet of film. Beneath the aperture 7 of the table 6 is an optical condenser system 8 and projection lamp 9 which, with the projection lens 10 and mirror 11, project the frame and associated coding onto the plane of the case which holds the screen. The lesson (i.e., portion viewed by student) as projected, is confined to the screen 2, whereas the coded portion of the film that is projected is confined to an array of light sensitive cells 12. These photosensitive cells in the array 12 are activated when light areas from the code holes 13 of the film (see FIG. 4) are focused on them.

Figure 5:
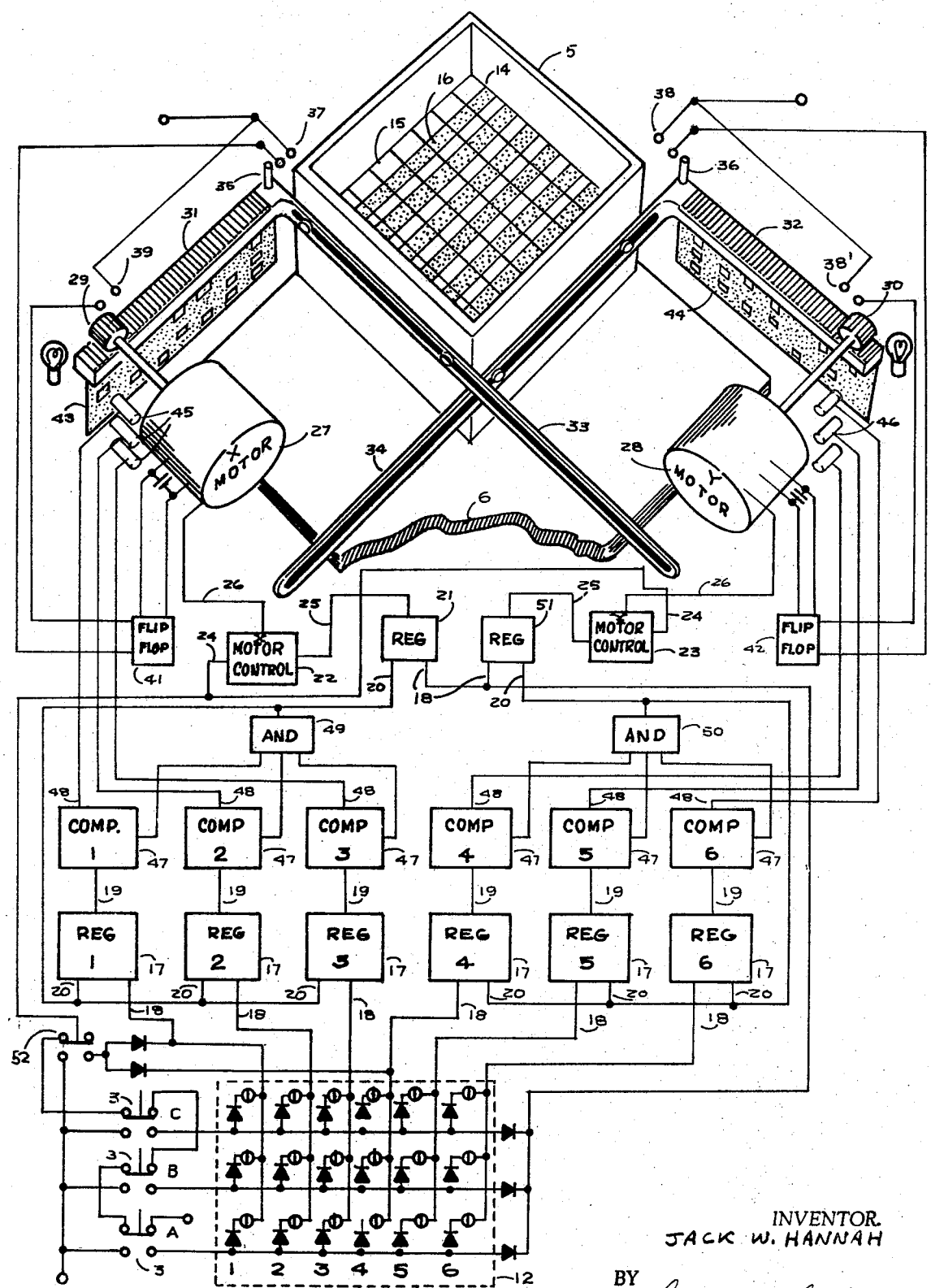
FIG. 5 is a combination pictorial and schematic diagram view of the rectangular array in its holder and the control mechanisms necessary to properly implace an information frame of the array over the optical projection system.

Referring now to FIG. 5, I shall describe the first of two basic techniques for moving the holder 5 so as to project the information frames 15 on the screen in a sequence determined by the response of the student. For the sake of facilitating description, assume that the holder 5 is in a position on the table 6 such that the optical projection system is projecting a lesson on the screen and the associated coding is being projected onto the array of photosensitive cells 12. FIG. 5 shows an array 12 physically located on the housing 1 consisting of six photocells assigned to each of three activating switches 3; but, as will be evident, the device of this invention need not be limited to three switches but can have as many switches as coded area 16 has rows of codes 13. The number of rows of codes 13 depend on, of course, and varies with, the size of area 16.

Suppose the student reads the lesson material projected on the screen and decides to press switch B. He will thereby close a circuit and allow flow of current to the B row of photocells in the array 12 that are connected to the B switch. Because of the code holes 13 imprinted on the B coded area of the film 16, certain of the photocells in this B row will be illuminated with light from the projection system while the others will be in the dark. The lighted cells will have a low resistance and therefore permit adequate current to flow to various associated registers 17. These registers are common devices having the circuit function of being turned on through a set lead 18 so that even after current is removed from the set lead, the device continues to remain switched, generating a current on an output lead 19. A current will continue to be generated from the output lead until the register is turned off by a separate, momentary current signal being present on a reset lead 20. Thus, due to low resistance on various of the illuminated photocells, the current passed by these selected photocells will set certain of the registers such that each such selected register generates an output signal on lead 19.

Whenever switch A, B, or C is closed, a signal is also sent to registers 21 and 51 (which are functionally like register 17) and these registers are placed in a set condition with signals being sent to the X motor control 22 and the Y motor control 23. Both motor controls are simple circuits performing the switching function of an AND circuit such that signals must be present on both input leads 24 and 25 to cause a signal on the output 26. The outputs from the X motor control and the Y motor control go to the X motor 27 and Y motor 28, causing them to operate. Neither motor control will operate until the student removes his finger from the push button which he has depressed. The normally closed contacts of switches A, B, and C are connected in series such that when any of the switches is manually pressed, the sources of current on lines 24 to both motor controls are opened.

When motors X and Y are turned on, they each drive a gear 29, 30 which in turn meshes with a flat, tracked, geared runner to move in a direction perpendicular to the motor shaft which drives it. The direction of the movement of the X runner 31 is perpendicular to the direction of the movement of the Y runner 32. As each runner moves, it also moves a rigidly associated slotted member 33 and 34. These slotted members are connected to the holder 5 in such a manner that the holder is free to slide within the confines of the slots. Hence, as the runners 31 and 32 move in their respective paths of freedom (i.e., in an X direction, or the perpendicular Y direction), the holder will be moved or slid over table 6 within an area limited by the length of runner 31 and of runner 32. This area of movement will be sufficient to permit every associated pair of frames 15 and 16 of the rectangular film to be placed in the optical projection path (i.e., over the aperture 7 of the table 6).

As the X runner 31 moves to the extremities where its gear meshes with the motor gear, the post 35 closes either contacts 37 or 39. When either contact is closed, it sends a signal to a flip flop circuit 41 which has two outputs to the X motor. Depending on which output is active, the X motor will turn in a clockwise or counter-clockwise fashion. Thus, if the motor is driving in a direction such that the post 35 closes contacts 39, the flip flop 41 will receive a signal which switches current to its other output lead, thereby reversing the motor direction and causing the X runner to move in the opposite direction.

The same description applies respectively to the Y runner 32, motor 28, and associated flip flop 42, post 36 and extremity contacts 38 and 38'.

As the X and Y runners traverse their paths, they each move an associated coded shield 43 and 44 which is opaque except for a coded array of transparent holes. As shown in FIG. 5, the coding on these shields is different in each of seven columns, each column containing no more than three holes. This coding pattern is related to the customary procedure of providing a multiple of distinctive codes from a small number of sensing devices. For example, with three photocell sensing devices 45 depending upon the pattern in which they are illuminated, seven different locations on the X runner can be detected. These seven different locations will correspond with the X coordinate rows of the rectangular film. Likewise, the Y runner has its associated shield 44, which is sensed by photocells 46. The seven columns of codes on the shield indicate the different locations that correspond to the Y coordinate rows of the rectangular film.

It will be recalled that initially I described certain registers 17 as having been set when one of the switches 3 was momentarily closed. This action also caused the motors to operate and consequently, the X runner and Y runner to move. Hence, the sensors 45 and 46 constantly detect the position of the holder 5 with respect to the optical projection system 6–7–8–9.

As the coded holes of the X shield 43 are moved past the sensors 45, various signal patterns are sent to the comparators 47 (COMP 1, COMP 2, and COMP 3) via conductors 48. Each of these comparators is an exclusive-or circuit, performing the function of providing an output as long as both of its input leads 19 and 48 have signals, or both do not have signals present. Thus, it is evident that the comparators serve to give an indication of whether or not two inputs are matched, i.e., both present or both not present. Therefore, when one of the switches 3 is depressed, certain of the registers REG 1, REG 2, and REG 3, will be set and the remainder not set so as to provide outputs (i.e., the presence or absence of a certain current level) that are compared with the outputs from sensors 45 serving the X coordinate. Likewise, the outputs of REG 4, REG 5 and REG 6 are compared with outputs from sensors 46 serving the Y coordinate by COMP 4, COMP 5, and COMP 6.

The coding placed into registers 1 through 6 from the photocell array 12 would be such that they indicate the frame that should next be presented to the operator-student. When the X motor drives the X runner and shield 43 to a location where the sensors 45 provide a match with the arrangement of outputs present at REG 1, REG 2, and REG 3, the comparators, COMP 1, COMP 2 and COMP 3 will all have identical output singles present. This condition will cause the three input-AND gate 49 to generate an output signal which resets register 21 and REG 1, REG 2, REG 3. When register 21 is reset it stops providing an input to the X motor control 22, which causes the X motor 27 to stop. Thus, the film holder 5 is ceased to be moved in the X direction, or, in other words, the X coordinate for the subsequent information frame to be projected has been found.

Meanwhile in like manner when the Y motor drives the Y runner and shield 44 to a location where sensors 46 provide a match with the arrangement of outputs present at REG 4, REG 5, REG 6, the comparators, COMP 4, COMP 5, COMP 6, will also all have identical outputs. This will cause AND gate 50 to signal a reset to register 51 and to REG 4, REG 5 and REG 6. Resetting register 51 stops Y motor control 23, and consequently the Y motor 28 stops, thus locating the Y coordinate.

With the X and Y coordinates of the frame located and the motors stopped, the optical projection system can be turned on and the student presented the information on the frame associated with the X and Y coordinates. Upon reading this frame, the student selects a switch 3 and a momentary contact will cause a new code pattern to be ready by the array 12. This will cause the above-described procedure to be repeated.

In describing the general operation of this device, no mention was made as to how the student would start at the proper initial frame after inserting his rectangular lesson film into the frame. Let us suppose that on every rectangular lesson film, the starting frame lies at coordinates designated by REG 1 and REG 4. Therefore, the student merely depresses switch 52 which places a setting signal directly on the inputs to REG 1 and REG 4, Having received these signals, the device would function as already described.

In the above description, for the device of FIG. 5, it is obvious that the three registers associated with the X coordinate give seven positions and likewise the three registers associated with the Y coordinate give seven positions for a total of forty-nine (7×7) different positions. Hence, the rectangular lesson film 14 could have 49 different pairs of frames 15 and 16. However, there is nothing in the means described which limit it to this size. It is evident that simply by increasing the number of registers, comparators and associated photocells in the sensing array 12, many more coordinate positions could be added. Hence, many more frames could be added to a film. For example, simply by adding one register, one comparator, and associated sensing cells for each of the X and Y coordinates, this device could accommodate a rectangular film with 225 frames. Therefore, it is evident that this device could also be used in rapidly retrieving information from a large plurality of information frames located on a rectangular film.

Thus, it can be seen that for each lesson frame viewed, there are three, or any other number, possible answers. Each answer has an associated push button, an associated row of coded holes on the frame, an associated row of photocells in array 12. In response to the answer chosen and corresponding parts as above-described, the device automatically presents a subsequent lesson frame. The instructions on this subsequent frame will vary with the correctness of the chosen answer. For example, if the lesson plan is one which calls for answering correctly a question, and the answer chosen is correct, the device by means of the codes and control means, presents another question; however, if the answer chosen is wrong, the code and control means may cause a corrective lesson to be presented. Such is, of course, dependent on the individual programming of the lesson as well as on the type of lesson being used. No limitation on the invention is to be placed by the above-described description, which is merely illustrative of one method of operation.

Figure 6:
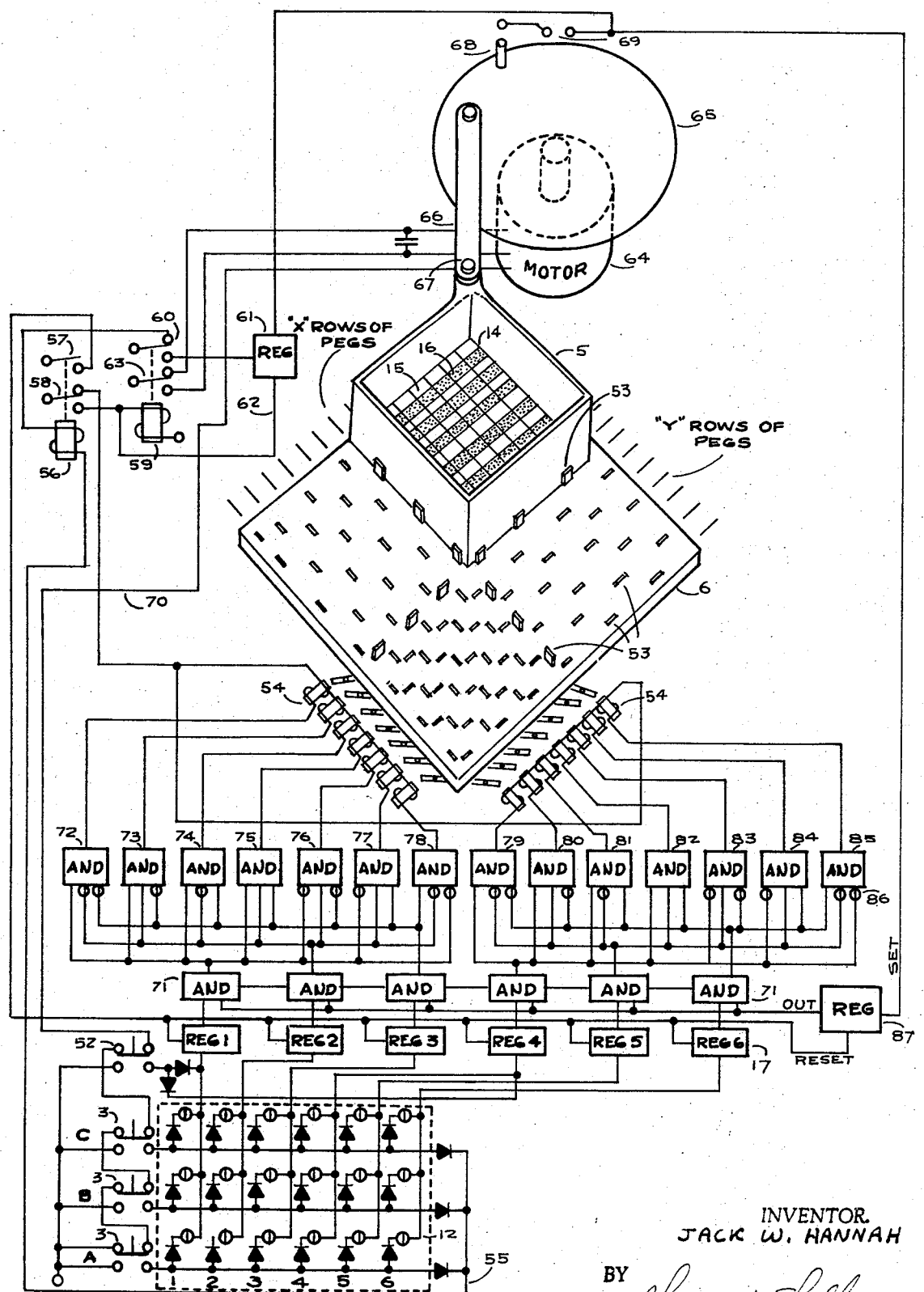
FIG. 6 is a combination pictorial and schematic diagram view of the rectangular array in another form of holder and control mechanism for implacing an information frame of the array over the optical system.

FIG. 6 shows another means for accomplishing the same end as described above. The student places a rectangular lesson film 14 containing a plurality of information frames 15 and associated coding 16 into a holder 5 which slides on the surface of a table 6.

In the device of FIG. 6, the table is constructed with rows of holes into which are inserted pegs 53. Each row of these pegs can be moved up, above the surface of the table 6; or down, being flush or beneath the surface of table 6. A row of pegs is pushed up if one of the electromagnets such as 54 is actuated, otherwise the row of pegs is down. The function of this device is, of course, to push up a row of pegs corresponding to a desired X coordinate and another row corresponding to a desired Y coordinate, then to slide the holder until its two leading sides are stopped by the rows of pegs. This lines up the holder so that a frame of the rectangular film with corresponding coordinates is positioned over the optical projection system.

Suppose, therefore, that the student is looking at a frame and makes a selection by pressing one of the momentary SWITCHES 3. Closure of this switch sends current along wire 55 to relay 56. Contact 57 then "makes," which sends a signal to reset all registers 17 (designated REG 1 through REG 6) and register 87. These registers are exactly like those described for FIG. 5. The break contact at 58 removes current from all electromagnets 53 of table 6 so that all pegs 53 will be in a down position. The make contact at 58 actuates relay 59.

When relay 59 is actuated break contact 60 opens up relay 56 so that contacts 57 and 58 return to an unoperated condition and the reset current is removed from the registers 17 and 87 while the table electromagnets 54 are restored to operable conditions. The "make" contact 60 sets register 61 which puts an output on line 62 thereby holding relay 59 operated. Break contact 63 stops the reversible motor 64 from operating in a counterclockwise direction. "Make" contact 63 causes the motor 64 to operate in a clockwise direction.

When motor 64 rotates, its shaft turns wheel 65 onto which is pinioned a rod 66. This rod is also attached by a pinion 67 to the holder 5. Hence, the clockwise turning of the motor will slide the holder 5 to the corner of the table 6 nearest the motor. As it reaches this corner, the post 68 closes contacts 69 which signals the system that the holder is out of the way of any of the X or Y rows of pegs on the table so that the X row and the Y row of pegs can be lifted which correspond to the coordinates of the next frame to be viewed by the student.

This is accomplished in the following manner. When the student depresses one of the momentary switches 3, relay 56 initiated actions to clear the registers 17 and slide the holder 5 out of the pegged area of the table as described above. The resetting current generated by relay 56 was only a pulse since the breaking of contact 60 deactivated relay 56. This happens so quickly that the student will still have the switch 3 depressed after the resetting has occurred. The motor 64 will not operate, however, until the depressed switch 3 has been released since the common lead 70 of the reversible motor 64 is connected in series with the normally closed contacts of all the switches 3. So, while the holder is still motionless, the projected codes from the film's coded frame 16 and 13 (refer to FIG. 4) are illuminating certain of the photocells in the array 12. Those photocells that are illuminated in the row chosen by the switch 3 closed by the student, will send current to set corresponding registers 17. Let us suppose that REG 1, REG 3, REG 4 and REG 5 are thus set. Each set register 17 will provide a constant output to a corresponding AND gate 71 even after the inputs to the registers are removed.

When the student removes his finger from a switch 3, the motor will activate as previously described, and pull the holder out of the way of the pegs. When the holder is out of the way and post 68 closes contacts 69, current is sent to set register 87. The output of this register then is sent to all the AND gates 71. Those AND gates 71 which also have inputs from those registers 17 which were set by the student's selection, will give an output signal. Hence, to continue the supposition made in the previous paragraph, the AND gates associated with REG 1, REG 3, REG 4 and REG 5 will now be generating output currents while the remaining AND gates 71, associated with REG 2 and REG 6, will not be producing outputs.

All the output wires from the AND gates designated as 71 associated with REG 1, REG 2, and REG 3, are connected to AND gates 72 through 78. These control the electromagnets 54 used to lift various of the Y rows of pegs 53. Likewise, all the output wires from the AND gates designated as 71 associated with REG 4, REG 5 and REG 6, are connected to AND gates 79 through 85. These control the electromagnets 54 used to lift various of the X rows of pegs 53. It will be noted that the AND gates 72 through 85 have at various of the inputs inverters designated by circles such as is shown by 86. The inverter merely performs the operation that if the wire leading into it has no current, it will invert this signal so that current is generated; or, if the wire leading into it has current, it will invert this signal so that no current is generated. But any of the AND gates 72 through 85 will only produce an output when all three leads, after inversion where it applies, have current present. For example, it was supposed that the AND gates 71 associated with REG 1 and REG 3 are given currents as outputs while the AND gate 71 associated with REG 2 is not given an output. By inspection, it will be found that only AND gate 74 is so structured with an inverter that the lack of current from REG 2, coupled with the fact that current is present from REG 1 and REG 3, will mean that all three of its inputs have current present. All other AND gates from 72 to 78 are so constructed that this combination of currents or lack of currents on their input wire will not result in an AND gate receiving three currents at its inputs. Hence, only AND gate 74 is activated by this particular combination and will cause an output to operate the one electromagnet to which its output is connected. This electromagnet raises one of the rows of pegs of the Y rows. Likewise, inspection will show that currents from REG 4 and REG 5 with no current from REG 6, is a combination that ultimately only affects AND gate 80, which then controls one of the electromagnets raising a row of pegs of the X rows.

Thus, a coordinate of X and Y rows of pegs is formed from the signals read by the photocell array 12. This occurs in a very short time. Meanwhile, in the manner previously described, the motor 64 moves in a counterclockwise direction and slides the holder 5 in the general direction away from the motor and towards the raised pegs. It will hit one of the raised rows of pegs (in this example, it would hit the Y row first). The holder will continue to move, sliding along the row of raised pegs it first hit until its adjacent side hits the second row. Here it will lodge and come to rest with a certain one of its frames, that corresponding to the raised X and Y coordinate of pegs, being in position over the optical projection system. Means can be provided to shut the motor off automatically when this position is reached, but this is not necessary since a motor may be used which can withstand stalling. The motor thus would stall in its counterclockwise motion and hold the holder firmly against the pegs.

In order to start this device at the proper frame after inserting the lesson film in the holder, the coordinate of the beginning lesson need only be that which is built into the device by wires connected to start switch 52. In this case, the drawing of FIG. 6 shows connections to REG 1 and REG 4. These are set by depressing switch 52, and the device operates as described above.

Again, as stated for the device of FIG. 5, the device of FIG. 6 is not limited to the size shown. It, too, can readily be expanded by adding registers 17, AND gates 71, and other AND gates of the same general type of 72 through 85, with, of course, an increase in the size of the table.

I claim:

1. A device using a rectangular film imprinted with a plurality of information frames, selected information frames having a question printed thereon and associated sets of codes corresponding to possible answers thereto which describe the position of proper subsequent information frames, which device comprises a rectangular film having a plurality of frames thereon arranged in columns and rows corresponding to an X-Y array, means to hold said rectangular film, means to project an information frame onto a viewing screen, means for indicating a chosen answer, means to record the associated set of codes corresponding to an answer chosen even after the desired answer is chosen and indicated, means for using said recording of said associated set of codes to align said holder of film with a selected X-Y coordinate whereby subsequent information frames that correspond to the recorded set of codes which in turn correspond to the answer chosen are placed in projectable position.

2. The device of claim 1 wherein the means to use said recording to align said holder of film comprises means to set a first circuit in response to an answer signal which first circuit provides output signals after being turned on even though the turn on signal is removed, means to move said film holder along two axes, means to detect the position of the holder with respect to both axes and to provide position signals, means to compare the position signals to the first circuit output signals, means to stop movement along either axis when the position signal and the first circuit output signal are matched.

3. The device of claim 1 wherein the means to use said recording to align said holder of film comprises means to set a first circuit in response to an answer signal which first circuit provides output signals after being turned on even though the turn on signal is removed, means to move said film holder in a general direction either out of an array of stops or into an array of stops depending on the initial position of the frame and the selected answer, until stopped at an X axis and Y axis formed by said stops, means to selectively raise certain of said stops independently to form an X axis and a Y axis corresponding to the answer signals activating said first circuit and engage and secure said film holder in cooperation with said film moving means on said X-Y axis.

4. In a system for instructing a person, wherein information is projected on a screen as static frames and wherein certain of said frames present a question to said person with a multiple of answers from which the person selects the one he believes correct, the combination of:
 a movable film holder;
 a rectangular film containing a plurality of information frames on said film in an order of parallel columns perpendicular to parallel rows;
 each of said frames having associated coding on said rectangular film capable of identifying several different frames, one of which would be the frame next to be shown in accordance with the answer or selection made by the person using said system;
 a group of contacts by which a person can indicate a selective or answering response;
 means for reacting to said responsive action and reading out a specific area of the code associated with the frame being viewed at the moment of making said response;
 means to use the specific coding read-out to align said film holder on a next frame located on the rectangular film at a position which corresponds to that which should next be shown depending on the responsive action, and which location may be offset from the original position of said film holder in more than one direction with respect to the order of parallel columns and rows of the frames on the rectangular film;
 an optical projector which projects a located frame onto a viewing screen.

5. The combination of claim 4 wherein the means to use the read-out of the coding associated with the frame at which a response is elicited to align the film holder on a particularly positioned next frame of the rectangular film comprises:
 means to operate a first circuit in response to said read-out coding which circuit provides output signals;
 means to move said film holder along two axes;
 means to detect the position of the holder with respect to both axes and to provide position signals;
 means to compare the position signals to the first circuit output signals;
 means to stop movement along either axis when the position signal and the first circuit output signal are matched.

6. The combination of claim 5 wherein said first circuit provides output signals after being turned on even though the turn-on signal is removed.

7. The combination of claim 4 wherein the means to use the read-out of the coding associated with the frame at which a response is elicited to align the film holder on a particularly positioned next frame of the rectangular film comprises:
 means to operate a first circuit in response to said read-out coding, which first circuit provides output signals;
 means whereby said output signals from said first circuit raise stops on a surface over which a film holder slides, said stops forming a plurality of X and Y axes;

means to move said film holder in a general direction either out of or into an array of said stops, until stopped at an X axis and Y axis formed by said stops;

means to raise stops forming a particular arrangement of X and Y axes corresponding to a particular group of output signals from said first circuit.

8. The combination of claim 7 wherein said first circuit provides output signals after being turned on even though the turn-on signal is removed.

References Cited

UNITED STATES PATENTS

| | | | |
|---|---|---|---|
| 3,084,334 | 4/1963 | Martin et al. | 340—173 |
| 3,229,047 | 1/1966 | Simpson | 340—173 |
| 3,284,923 | 11/1966 | Leslie | 35—8 |
| 3,383,662 | 5/1968 | Spieker et al. | 340—173 |
| 3,383,781 | 5/1968 | Diuzet | 35—9 |
| 3,395,464 | 8/1968 | Leslie et al. | 35—9 |

WILLIAM H. GRIEB, Primary Examiner